United States Patent [19]
Lhotak

[11] Patent Number: 5,671,345
[45] Date of Patent: Sep. 23, 1997

[54] SYSTEM AND METHOD FOR INTERCEPTING AND RECONSTRUCTING GRAPHICS MANAGEMENT TOOL MARKING INSTRUCTIONS

[75] Inventor: Vladimir Lhotak, Santa Clara, Calif.

[73] Assignee: Apple Computer, Inc., Cupertino, Calif.

[21] Appl. No.: 475,039

[22] Filed: Jun. 6, 1995

[51] Int. Cl.$^6$ ............................................. G06T 11/00
[52] U.S. Cl. ........................ 395/133; 395/785; 395/788
[58] Field of Search ................................. 395/112, 114, 395/115, 116, 144, 145, 146, 147, 148, 133, 135, 141, 763, 777, 779, 785, 788; 345/115, 116

[56] References Cited

U.S. PATENT DOCUMENTS

| | | | |
|---|---|---|---|
| 5,164,014 | 11/1992 | Vassar | 395/112 |
| 5,226,112 | 7/1993 | Mensing et al. | 395/114 |
| 5,278,950 | 1/1994 | Takei et al. | 395/134 |
| 5,293,466 | 3/1994 | Bringmann | 395/114 |
| 5,386,502 | 1/1995 | Minagawa et al. | 395/141 |
| 5,400,243 | 3/1995 | Oheda et al. | 364/419.17 |
| 5,402,530 | 3/1995 | Boenke et al. | 395/112 |
| 5,444,826 | 8/1995 | Okada | 395/112 |
| 5,448,688 | 9/1995 | Hemingway | 395/141 |
| 5,473,739 | 12/1995 | Hsu | 395/134 |
| 5,475,801 | 12/1995 | Brindle et al. | 395/114 |
| 5,511,149 | 4/1996 | Hayano | 395/112 |
| 5,524,186 | 6/1996 | Campbell | 395/115 |
| 5,567,441 | 10/1996 | Stone et al. | 395/133 |
| 5,600,768 | 2/1997 | Anderson | 395/135 |

*Primary Examiner*—Mark K. Zimmerman
*Assistant Examiner*—Stephen Hong
*Attorney, Agent, or Firm*—Burns, Doane, Swecker & Mathis, L.L.P.

[57] ABSTRACT

The present invention is a method and system employing a glue code for: 1) intercepting low-level device dependent information from a graphics management interpreter software tool and 2) re-construct the low-level device dependent information into a high-level object oriented data representation for each object on a given page. The interpreter software is configured such that it transmits marking request signals and associated data to a fictitious frame buffer. However, the glue code of the present invention intercepts the marking request signals and associated data and transmits back receipt acknowledgment signals to the interpreter to make it think that it is writing to a frame buffer. As a result, the interpreter software transmits all marking requests and associated data to the glue code. The glue code then processes the low level device dependent information transmitted from the interpreter and reconstructs it into a high-level object oriented data representation using the information provided by the marking request.

19 Claims, 3 Drawing Sheets

SYSTEM AND METHOD FOR INTERCEPTING AND RECONSTRUCTING GRAPHICS MANAGEMENT TOOL MARKING INSTRUCTIONS

FIELD OF THE INVENTION

The present invention relates to graphics management methods in computer systems and particularly to interpretation software used in a display device for displaying data.

BACKGROUND OF THE INVENTION

A graphics management software tool and its corresponding language, such as Postscript, is used in a computer system to manage graphical data in order to display a page of objects on a display device. In general, the graphics tool's language and software are used to control, 1) font and size of text characters on a page, 2) placement and manipulation of objects upon a page, and 3) size and shape of graphical objects. Commonly, a program written in a language associated with the graphics tool functions to describe a page of objects in terms of a higher level device-independent page description. This description language is typically in a format unique to the graphics tool and is relatively compact (with respect to memory storage area). For instance, in a high level description, a circle on a page might be described as a circle having a given size and location on the page. Alternatively, the circle may be described in terms of smaller trapezoidal objects. The language used to describe this is in a condensed and encoded format.

Each display device has an associated resolution (i.e. pixels/page). In order to display a page of graphics on a device, it is necessary to provide the appropriate data for each of the pixels in the page. Thus, in order to use the high-level page description to drive a device to display a page of objects, the high level description needs to be interpreted and converted into a lower level device-dependent pixel (i.e. picture elements) representation of the page. In general, a display device, such as a printer, is designed to include software or hardware for performing this high-to-low level description interpretation. Typically, the interpretation software/hardware is designed such that in response to the high level page description language it outputs a corresponding low level device dependent pixel representation which can be used directly to drive the display device. The problem with interpretation software/hardware designed in this manner is that it is not possible to access or intercept data at certain processing points within the interpretation processing software. In particular, it is not possible to access individual object data after it has been processed through the interpretation software. Instead, the interpreter software output data is in a form in which objects are superimposed upon one another making it impossible to discern between them.

For instance, the Postscript graphics management tool offers a Postscript Interpreter software that processes high level Postscript page description data and outputs low level device dependent data that may be directly used to drive an I/O device. The Postscript Interpreter software is designed so as not to allow the user access to intermediate low level object oriented graphical data within the Postscript interpreter processing sequence. Consequently, the user is unable to modify or enhance this graphical data on an object-to-object basis once the Postscript interpreter has begun processing it.

After processing, the Postscript Interpreter writes the low level pixel data corresponding to each object to a frame buffer memory area. However, the low level data written into the frame buffer is in a form such that individual objects are no longer discernible making any subsequent object oriented enhancement processing steps prohibitive. Consequently, the user of a graphics tool like the Postscript interpreter is restricted to performing all conversions and interpretations as prescribed by the specific interpreter software.

What would be desirable is to give the user the flexibility to access intermediate object data within the interpreter software at certain points within its processing path and thereby allow the user to perform graphical enhancement processing steps on the intermediate data.

SUMMARY OF THE INVENTION

The present invention is a method and system for intercepting low level intermediate object data in a first format from a graphics management tool's interpreter software code, reconstructing the intercepted data into a high level object-oriented display list of data in a second format and then performing subsequent image processing using another graphics management tool.

According to the method and system of the present invention, a graphics management tool's interpreter software is used to convert a high level abstract description of a page of objects into a low level device dependent description. Both of the high and low level descriptions are in a first format unique to the graphics management tool. The interpreter software is configured to write its low level description results into a fictitious frame buffer memory storage area on a per-object basis by issuing marking requests—each having associated object data—to the frame buffer. However instead of transmitting marking requests and object data to a frame buffer, the requests are intercepted by the glue code of the present invention.

The glue code of the present invention intercepts the marking requests sent by the interpreter software and acknowledges receipt of the marking requests to make it appear to the interpreter software that data is actually being written into the frame buffer. In addition, the glue code accumulates state history for each request and interprets the redirected marking requests using the accumulated state history so as to reconstruct it into a high-level object oriented display list having a second format unique to a second graphics tool. This display list may then be used by the second graphics tool to perform other manipulations or processes to the page of objects prior to converting the display list data to a form usable to drive a device.

In one embodiment of the present invention, the first graphics tool's interpreter is the Postscript Interpreter being responsive to Postscript page description language. Further to this embodiment, the reconstructed display list is compatible to Apple imaging software. The Apple imaging software is used to process and manipulate the display list data prior to using it for driving the display device.

DETAILED DESCRIPTION

The present invention is a method and system for intercepting intermediate low level object data in a first format from a first graphics management tool's interpreter software and re-constructing it into an object oriented display list in a second format usable by a second graphics management tool. In the following description, numerous specific details are set forth, such as graphics management software tools and languages, in order to provide a thorough understanding of the present invention. It will be obvious, however, to one skilled in the art that these specific details need not be employed to practice the present invention. In other instances, well understood system structures, and software theory and language formats have not been described in detail in order to avoid unnecessarily obscuring the present invention.

Figure 1A:
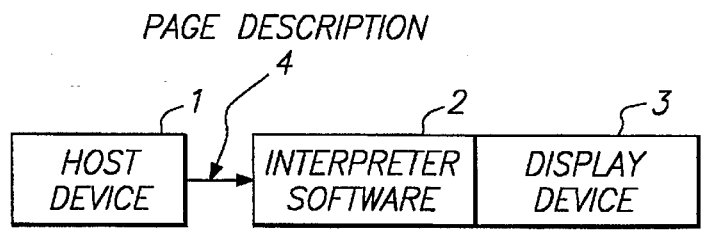
FIG. 1A illustrates a prior art system employing a graphics management interpreter software to drive a display device.

FIG. 1A, illustrates the structure of a system having a host 1 that provides a page description 4 formatted according to a specific page description language to interpreter software 2. In response to page description 4, the interpreter outputs low level data to the display device causing the device to display a page of data corresponding to page description code 4. Typically, the interpreter software and the display device are bundled together and are often treated essentially as unit. In other words, once the page description is provided to the interpreter software, the data generated at the output of the interpreter is directly used to drive the display device.

Figure 1B:
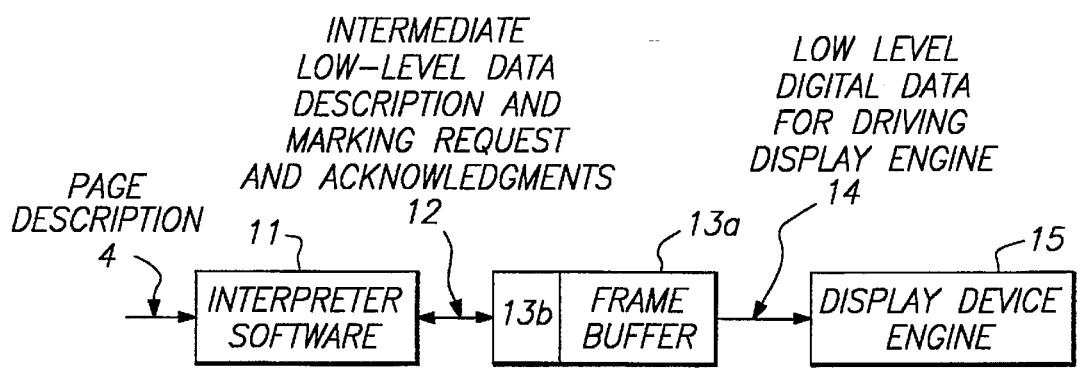
FIG. 1B is a diagram illustrating the processing steps performed to drive a display device using a prior art interpreter software.

When displaying a page of data described by a given page description language, the interpreter may be configured such that it internally stores interpreted data. In this case, data is commonly coupled directly to the display device engine from the interpreter. The interpreter may alternatively be configured to store interpreted data to a frame buffer before using this data to drive the display device. FIG. 1B illustrates a system having the interpreter configured in this manner having interpreter software 11, frame buffer 13a, and display device engine 15. Frame buffer 13a is a memory device or digital data storage area for storing digital pixel data. Included with frame buffer 13a is marking software 13b.

The system shown in FIG. 1B functions such that interpreter 11 processes page description 4 and generates marking requests 12 having associated low-level data (FIG. 1B). Marking Requests generally carry data defining an object or portions of an object. It should be understood that henceforth when referring to an object that this may refer to an object such as a circle or may refer to an object such as a trapezoid which makes up an object like a circle.

The marking requests are coupled to marking software 13b. The marking software translates the marking requests into low-level pixel data and writes this data into frame buffer 13a. In addition, the marking software sends a marking acknowledgment signal back to the interpreter to indicate that the data has been written into the frame buffer.

When data is written into the frame buffer it is either written into a new pixel/memory location within the buffer, is written over a previously stored pixel location in the buffer when objects are positioned over one another, or sometimes new data is logically combined with previously stored data.

Once the pixel data corresponding to all of the objects on the page are written into the frame buffer, it may be used to drive the display device engine 15 to display the given page. Due to the way in which the pixel data is written into the frame buffer, the data stored in the frame buffer no longer provides all of the information about each of the objects. Specifically, some of the data from the objects has been lost due to the over writing or combining of object data within the buffer. Thus, the data stored in the frame buffer is no longer in an object oriented form since the objects are no longer distinguishable. Consequently, it is not possible to perform any type of object oriented enhancement or manipulation operations on the data subsequent to the interpreter software stage 11.

One widely used interpreter software and page description language used in a system such as that described in FIG. 1B is the Adobe Postscript Interpreter and its corresponding Postscript language. As currently implemented, the Postscript Interpreter does not allow access to its data while it is being processed by the Postscript Interpreter. Consequently, if a user employs Postscript Interpreter software they are unable to perform object oriented post-interpretation image processing operations since the data is no longer in object oriented form. Alternatively, if a user chooses not to employ the Postscript Interpreter they are left with the undesirable and non-trivial task of re-engineering a new interpreter software tool.

Figure 2:
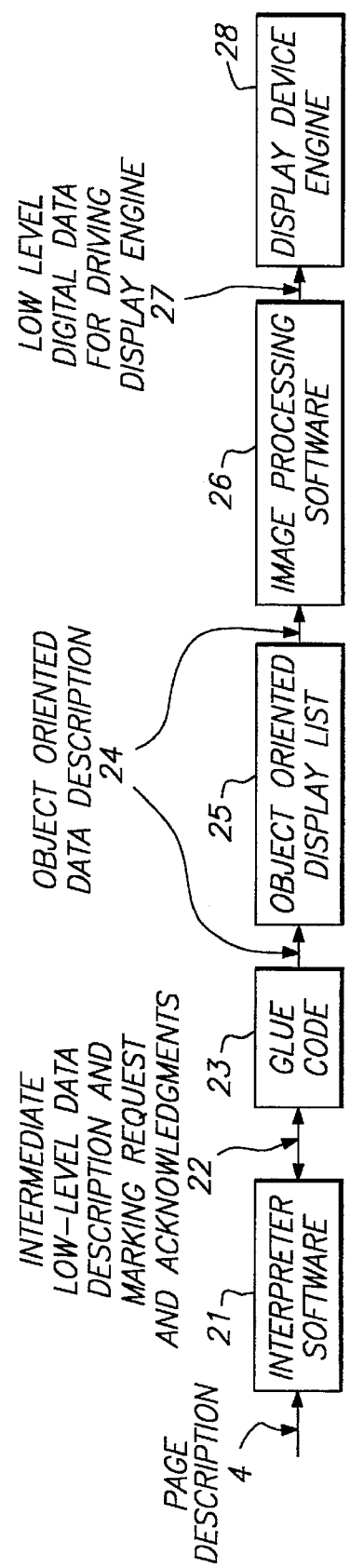
FIG. 2 illustrates the system of the present invention using a glue code as described according to the present invention for intercepting marking requests in a first format from interpreter software and creating a high level object oriented display list second format.

The present invention is a method and system for intercepting the marking requests and associated low level data (formatted according to the interpreter software) and reconstructing it into a higher level object oriented display list usable by a graphics management software tool other than the interpreter software tool. Referring to FIG. 2, page description 4 is coupled to interpreter software 21. As previously described in conjunction with the prior art implementation shown in FIG. 1B, the interpreter transmits marking requests and associated low level pixel data to a frame buffer for each object. However, in the system and method of the present invention, the marking requests are routed to glue code 23 of the present invention. A marking request at this point in the processing sequence is in a format unique to the interpreter code associated software language.

Glue code 23 performs several functions. First it sends receipt acknowledgment signals back to interpreter software 21. The acknowledgment signals sent by the glue code are the same as the acknowledgment signals that the marking software 13b transfers in the prior art system shown in FIG. 1B. Consequently, the interpreter software thinks that it is communicating with the marking software. Glue code 23 also accumulates state history from the marking requests such as, the type of data encoded in the marking request, when each marking request occurred, and the order in which the requests occurred. The glue code 23 uses the accumulated state history to process each marking request and its associated data to re-construct it into a high level object oriented data description 24 (in a second format) corresponding to each object. This re-constructed object description is stored in an object oriented display list 25.

The object oriented description data stored in display list 25 is in a new format such that it may be processed by subsequent image processing software/hardware stages 26 to further enhance object data. In other words, the new formatted data at this point in the processing sequence is unique to the subsequent image processing software language. Image processing stages 26, also converts the object description data it has processed into low level pixel data 27 which may be used to drive display device engine 28.

Figure 3:
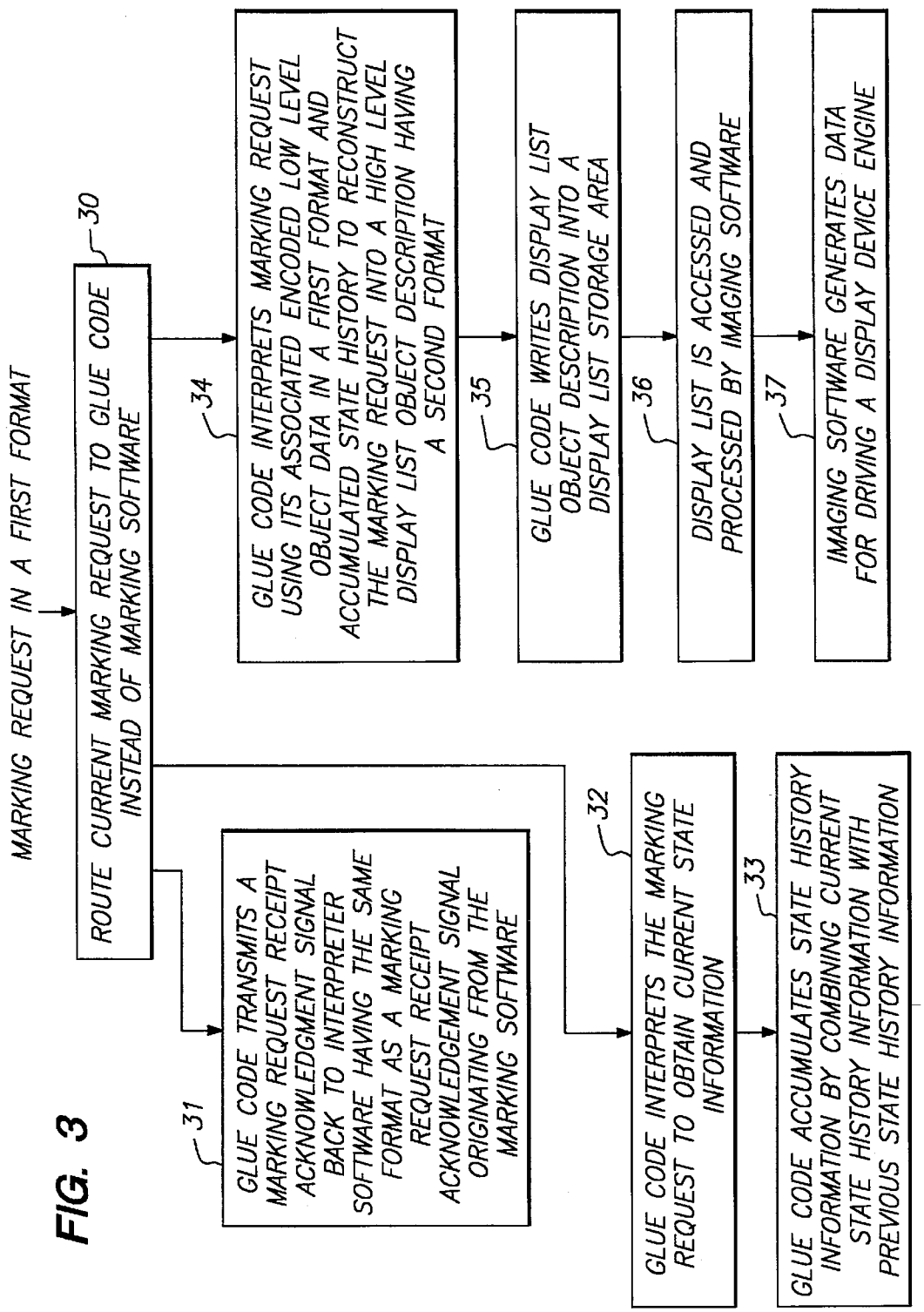
FIG. 3 illustrates the method of the present invention for intercepting marking requests in a first format from interpreter software and creating a high level object oriented display list in a second format.

The steps of method of the present invention are shown in FIG. 3 beginning with a current marking request being routed (block 30) to the glue code 23 (FIG. 2) of the present invention instead of to the marking software 13b (FIG. 1B). Once the marking request is routed to the glue code, the glue code performs several functions. First, the glue code transmits a marking request acknowledgment signal back to the interpreter software (block 31). The acknowledgment signal sent by the glue code has the same format as an acknowledgment signal sent by the marking software so as to make it appear to the interpreter that the marking software is acknowledging receipt of the marking request. The glue code also interprets the current marking request to obtain state information (block 32) and then combines this information with previously acquired state information (block 33). In addition, the glue code interprets the marking request and its associated encoded low level object data along with the accumulated state history to reconstruct the current marking request into a high level display list object description having a second format (block 34). After generating the display list description it is written into a display list storage area (block 35) which is subsequently accessed and processed by an imaging software (block 36). After processing, the imaging software converts the processed display list descriptions into pixel data suitable for driving a display device (block 37).

Although the elements of the present invention have been described in conjunction with certain embodiments, it is appreciated that the invention can be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. A system having a processor for performing digital data processing in response to software code, said system generating data for driving a display device engine including interpreter software code for interpreting a first object-based page description that is formatted according to a first software language and converting said first page description into a marking request, said marking request being formatted according to said first software language, said interpreter software code being configured so as to transmit said marking request to a marking software code and await a marking request receipt acknowledgment signal back from said marking software code, said system comprising:

a first software code for intercepting said marking request originating from said interpreter software code, said first software code transmitting said marking request receipt acknowledgment signal to said interpreter software code in response to said marking request, said first software code evaluating said marking request to obtain marking request state information, said first software code combining previous marking request state information with said marking request state information to generate accumulated marking request state information, said first software code converting said marking request into an object-based display list description by interpreting said marking request and said accumulated marking state information, said display list description being formatted according to a second software language and providing individual object data;

a digital storage area for storing said display list description;

a second object-based software code for accessing said display list description from said digital storage area, for processing said display list description, and for converting said display list description into said data for driving said display device engine.

2. The system as described in claim 1 wherein said display device is a printer.

3. The system as described in claim 1 wherein said first software language is Postscript.

4. The system as described in claim 1 wherein said interpreter software code is a Postscript Interpreter.

5. The system as described in claim 1 wherein said second software code is object-based image processing software code.

6. A system for generating data for driving a display device engine including interpreter software code for interpreting a first object-based page description that is formatted according to a first software language and converting said first page description into a marking request, said marking request being formatted according to said first software language, said interpreter software code being configured so as to transmit said marking request to a marking software code and awaits a marking request receipt acknowledgment signal back from said marking software code, said system comprising:

a first means for intercepting said marking request originating from said interpreter software code, said first means transmitting said marking request receipt acknowledgment signal to said interpreter in response to said marking request, said first means evaluating said marking request to obtain marking request state information, said first means combining previous marking request state information with said marking request state information to generate accumulated marking request state information, said first means converting said marking request into an object-based display list description by interpreting said marking request and said accumulated marking state information, said display list description being formatted according to a second software language and providing individual object data;

a digital storage area means for storing said display list description;

a second means for accessing said display list description from said digital storage area, for performing object-based processing on said display list description, and for converting said display list description into said data for driving said display device engine.

7. The system as described in claim 6 wherein said display device is a printer.

8. The system as described in claim 6 wherein said first software language is Postscript.

9. The system as described in claim 6 wherein said interpreter software code is a Postscript Interpreter.

10. The system as described in claim 6 wherein said second means is object-based image processing software code.

11. The system as described in claim 6 wherein said first means is software code.

12. The system as described in claim 6 wherein said first means is hardware circuitry.

13. In a system for generating data for driving a display device engine including interpreter software code for interpreting a first object-based page description that is formatted according to a first software language and converting said first page description into a marking request, said marking request being formatted according to said first software language, said interpreter software code being configured so as to transmit said marking request to a marking software code and await a marking request receipt acknowledgment signal back from said marking software code, said method comprising the steps of:

intercepting said marking request originating from said interpreter software code and transmitting it to a first software code;

transmitting said marking request receipt acknowledgment signal from said first software code to said interpreter software code in response to said marking request;

evaluating said marking request to obtain marking request state information;

combining previous marking request state information with said marking request state information to generate accumulated marking request state information;

converting said marking request into an object-based display list description by interpreting said marking request and said accumulated marking state information, said display list description being formatted according to a second software language and providing individual object data;

storing said display list description into a digital storage area;

accessing said display list description from said digital storage area with an object-based second software code being formatted according to said second software language;

processing said display list description with said second software code;

converting said display list description into said data for driving said display device engine.

14. The method as described in claim 13 wherein said display device is a printer.

15. The method as described in claim 13 wherein said fist software language is Postscript.

16. The method as described in claim 13 wherein said interpreter software code is a Postscript Interpreter.

17. The method as described in claim 13 wherein said second means is object-based image processing software code.

18. A computer readable medium containing program instructions usable in a system for generating data for driving a display device engine including interpreter software code for interpreting a first object-based page description that is formatted according to a first software language and converting said first page description into a marking request, said marking request being formatted according to said first software language, said interpreter software code being configured so as to transmit said marking request to a marking software code and await a marking request receipt acknowledgment signal back from said marking software code, said program instructions performing the steps of:

intercepting said marking request originating from said interpreter software code;

transmitting said marking request receipt acknowledgment signal from a first software code to said interpreter software code in response to said marking request;

evaluating said marking request to obtain marking request state information;

combining previous marking request state information with said marking request state information to generate accumulated marking request state information;

converting said marking request into an object-based display list description by interpreting said marking request and said accumulated marking state information, said display list description being formatted according to a second software language and providing individual object data;

storing said display list description into a digital storage area;

accessing said display list description from said digital storage area with an object-based second software code being formatted according to said second software language;

processing said display list description with said second software code;

converting said display list description into said data for driving said display device engine.

19. In a system having a processor said processor performing digital data processing in response to software code, said system comprising:

an interpreter software code for interpreting a first object-based page description that is formatted according to a first software language and converting said first page description into a marking request, said marking request being formatted according to said first software language, said interpreter software code being configured so as to transmit said marking request to a marking software code and expect a marking request receipt acknowledgment signal back from said marking software code;

a first software code for intercepting said marking request originating from said interpreter software code, said first software code transmitting said marking request receipt acknowledgment signal to said interpreter software code in response to said marking request, said first software code evaluating said marking request to obtain marking request state information, said first software code combining previous marking request state information with said marking request state information to generate accumulated marking request state information, said first software code converting said marking request into an object-based display list description by interpreting said marking request and said accumulated marking state information, said display list description being formatted according to a second software language and providing individual object data;

a digital storage area for storing said display list description;

a second object-based software code means for accessing said display list description from said digital storage area, for processing said display list description, and for converting said display list description into data for driving a display device engine;

a display device for displaying an image corresponding to said display device driving data.

\* \* \* \* \*